(12) United States Patent
Kim et al.

(10) Patent No.: US 12,398,838 B2
(45) Date of Patent: Aug. 26, 2025

(54) INSULATION STRUCTURE, INSULATED PIPING DEVICE INCLUDING THE SAME, AND METHOD OF FABRICATING THE SAME

(71) Applicant: Samsung Electronics Co., Ltd., Suwon-si (KR)

(72) Inventors: Dongwan Kim, Suwon-si (KR); Jeong-Hyun Kim, Pyeongtaek-si (KR); Seung-Hyeok An, Hwaseong-si (KR); Saya Lee, Osan-si (KR); Yoong Chung, Suwon-si (KR); Jiho Jeon, Yeosu-si (KR); Yongjun Cho, Pyeongtaek-si (KR); Injun Choi, Hwaseong-si (KR)

(73) Assignees: SAMSUNG ELECTRONICS CO., LTD., Suwon-si (KR); TECHNICAL COATING SOLUTION LINE-X CO., LTD., Hwaseong-si (KR)

( * ) Notice: Subject to any disclaimer, the term of this patent is extended or adjusted under 35 U.S.C. 154(b) by 387 days.

(21) Appl. No.: 17/863,843

(22) Filed: Jul. 13, 2022

(65) Prior Publication Data
US 2023/0081831 A1 Mar. 16, 2023

(30) Foreign Application Priority Data
Sep. 10, 2021 (KR) .......... 10-2021-0121121

(51) Int. Cl.
*F16L 59/02* (2006.01)
*F16L 59/10* (2006.01)
*F16L 59/14* (2006.01)

(52) U.S. Cl.
CPC .......... *F16L 59/029* (2013.01); *F16L 59/028* (2013.01); *F16L 59/10* (2013.01); *F16L 59/14* (2013.01)

(58) Field of Classification Search
CPC ........ F16L 59/141; F16L 59/143; F16L 59/12
(Continued)

(56) References Cited

U.S. PATENT DOCUMENTS 3,355,572 A * 11/1967 Chrow .................. F16L 53/38
219/535
3,359,351 A * 12/1967 Bender .................. F16L 59/22
264/45.5

(Continued)

FOREIGN PATENT DOCUMENTS

JP 2010190388 A 9/2010
JP 2020159476 A 10/2020
(Continued)

*Primary Examiner* — David R Deal
(74) *Attorney, Agent, or Firm* — Myers Bigel, P.A.

(57) ABSTRACT

Insulation structures, insulated piping devices including the same, and methods of fabricating the same are disclosed. The insulation structure includes a first insulation layer on an outer surface of a pipe, a second insulation layer on an outer surface of the first insulation layer that includes a material different from a material of the first insulation layer, and a third insulation layer on an outer surface of the second insulation layer that includes a material different from the material of the second insulation layer. A thickness of the second insulation layer is greater than a thickness of the first insulation layer and a thickness of the third insulation layer. The second insulation layer includes a porous foam.

17 Claims, 9 Drawing Sheets

(58) Field of Classification Search
USPC .................................. 138/149, 140, 137
See application file for complete search history.

(56) References Cited

U.S. PATENT DOCUMENTS

| | | | | |
|---|---|---|---|---|
| 3,665,968 A * | 5/1972 | De Putter | ............... | F16L 59/14 138/DIG. 2 |
| 3,812,886 A * | 5/1974 | Hallwood | ............... | F16L 59/06 138/149 |
| 4,429,213 A * | 1/1984 | Mathieu | ............... | F24H 1/142 428/920 |
| 5,160,769 A * | 11/1992 | Garrett | ............... | F16L 59/04 138/143 |
| 6,058,979 A * | 5/2000 | Watkins | ............... | B29C 70/66 428/36.5 |
| 8,371,338 B2 * | 2/2013 | Princell | ............... | F16L 59/147 138/131 |
| 8,522,829 B2 * | 9/2013 | D'Souza | ............... | C04B 26/10 138/146 |
| 2010/0071797 A1 * | 3/2010 | Jungers | ............... | F16L 9/14 138/149 |
| 2014/0220277 A1 * | 8/2014 | Lewis | ............... | F16L 59/021 428/319.3 |
| 2017/0059080 A1 * | 3/2017 | Zheng | ............... | B32B 5/18 |
| 2019/0329486 A1 | 10/2019 | Goulet | | |
| 2023/0228362 A1 * | 7/2023 | Pilone | ............... | B29C 63/0017 138/149 |

FOREIGN PATENT DOCUMENTS

| | | |
|---|---|---|
| JP | 2021001659 A | 1/2021 |
| KR | 20040081416 A | 9/2004 |
| KR | 20100013834 A | 2/2010 |
| KR | 20110123919 A | 11/2011 |
| KR | 101174309 B1 | 8/2012 |
| KR | 101781123 B1 | 9/2017 |
| KR | 102050809 B1 | 12/2019 |
| KR | 102142823 B1 | 8/2020 |
| KR | 102191257 B1 | 12/2020 |
| KR | 102216580 B1 | 2/2021 |
| WO | 2016156467 A1 | 10/2016 |

* cited by examiner

INSULATION STRUCTURE, INSULATED PIPING DEVICE INCLUDING THE SAME, AND METHOD OF FABRICATING THE SAME

CROSS-REFERENCE TO RELATED APPLICATION

This U.S. nonprovisional application claims priority under 35 U.S.C. § 119 to Korean Patent Application No. 10-2021-0121121 filed on Sep. 10, 2021 in the Korean Intellectual Property Office, the disclosure of which is hereby incorporated by reference in its entirety.

FIELD

The present inventive concepts relate to an insulation structure, an insulated piping device including the same, and a method of fabricating the same, and more particularly, to an insulation structure that can prevent dew condensation, an insulated piping device including the same, and a method of fabricating the same.

BACKGROUND

Various processes may be performed to fabricate a semiconductor device. For example, the semiconductor device may be fabricated by performing a photolithography process, an etching process, and a deposition process on a wafer. Such processes may require a low-temperature environment. A cryogenic coolant may be used to accomplish the low-temperature environment. The cryogenic coolant may flow though a pipe toward a process chamber. The cryogenic coolant may reduce a temperature of the pipe through which the coolant flows.

SUMMARY

Some embodiments of the present inventive concepts provide an insulation structure that can reduce or prevent water vapor from condensation, an insulated piping device including the same, and a method of fabricating the same.

Some embodiments of the present inventive concepts provide an insulation structure that can reduce or prevent an insulation layer from damage and can increase a life span, an insulated piping device including the same, and a method of fabricating the same.

Some embodiments of the present inventive concepts provide an insulation structure that is applicable to variously shaped pipes, an insulated piping device including the same, and a method of fabricating the same.

The object of the present inventive concepts is not limited to the mentioned above, and other objects which have not been mentioned above will be clearly understood to those skilled in the art from the following description.

According to some embodiments of the present inventive concepts, an insulated piping device may comprise: a pipe; and an insulation structure on the pipe. The insulation structure may include: a first insulation layer on an outer surface of the pipe; a second insulation layer on an outer surface of the first insulation layer that includes a material different from a material of the first insulation layer; and a third insulation layer on an outer surface of the second insulation layer that includes a material different from the material of the second insulation layer. A thickness of the second insulation layer may be greater than a thickness of the first insulation layer and a thickness of the third insulation layer. The second insulation layer may include a porous foam.

According to some embodiments of the present inventive concepts, an insulation structure may comprise: a first insulation layer on an outer surface of an insulation target; a second insulation layer on the first insulation layer; and a third insulation layer on the second insulation layer. The second insulation layer may include a porous foam. A thickness of the second insulation layer may be greater than a thickness of the first insulation layer. A thermal conductivity of the first insulation layer may be less than a thermal conductivity of the second insulation layer. A hardness of the third insulation layer may be greater than a hardness of the second insulation layer.

According to some embodiments of the present inventive concepts, a method of fabricating an insulated device may comprise: forming a first insulation layer on an outer surface of an insulation target; forming a second insulation layer on the first insulation layer that includes a material different from a material of the first insulation layer; and forming a third insulation layer on the second insulation layer that includes a material different from the material of the second insulation layer. A thickness of the second insulation layer may be greater than a thickness of the first insulation layer. The second insulation layer may include a porous foam.

Details of other example embodiments are included in the description and drawings.

DETAILED DESCRIPTION OF EMBODIMENTS

Figure 1:
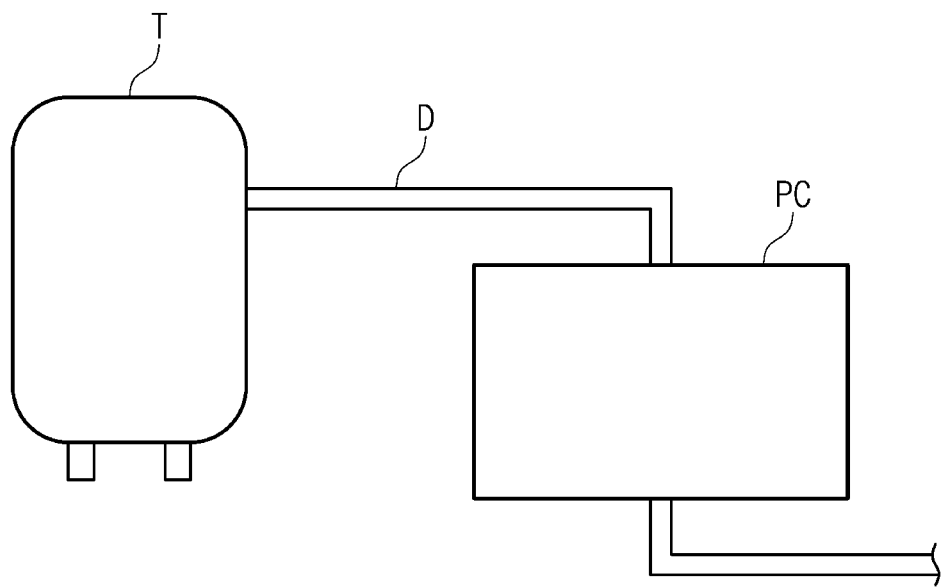
FIG. 1 illustrates a schematic diagram showing a semiconductor fabrication system according to some embodiments of the present inventive concepts.

The following will now describe some embodiments of the present inventive concepts with reference to the accompanying drawings. Like reference numerals may indicate like components throughout the description.

FIG. 1 illustrates a schematic diagram showing a semiconductor fabrication system according to some embodiments of the present inventive concepts.

Referring to FIG. 1, a semiconductor fabrication system may be provided. The semiconductor fabrication system may perform a process that forms an integrated circuit (IC) on a substrate such as a wafer. A cryogenic coolant may be used in semiconductor fabrication process. The semiconductor fabrication system may include a coolant tank T, a process chamber PC, and an insulated piping device D.

The coolant tank T may provide a space in which a coolant is stored. The coolant tank T may provide the process chamber PC with the coolant as needed. The coolant tank T may be connected to the process chamber PC. For example, the coolant tank T may be connected through the insulated piping device D to the process chamber PC.

The process chamber PC may be configured to provide a space in which a process that forms an integrated circuit on a substrate is performed. A photolithography process, an etching process, a deposition process, a cleaning process, a test process and/or other processes for forming an integrated circuit on a substrate may be executed in the process chamber PC.

The insulated piping device D may connect the coolant tank T to the process chamber PC. The coolant may flow from the coolant tank T to the process chamber PC along the insulated piping device D. The insulated piping device D may block external heat from being transferred to the coolant. The insulated piping device D may include an insulating material. A detailed description thereof will be further discussed below. Although as described herein, the insulated piping device D connects the coolant tank T to the process chamber PC, the present inventive concepts are not limited thereto. For example, the insulated piping device D may be used in a different system that allows flow of low-temperature fluid.

Figure 2:
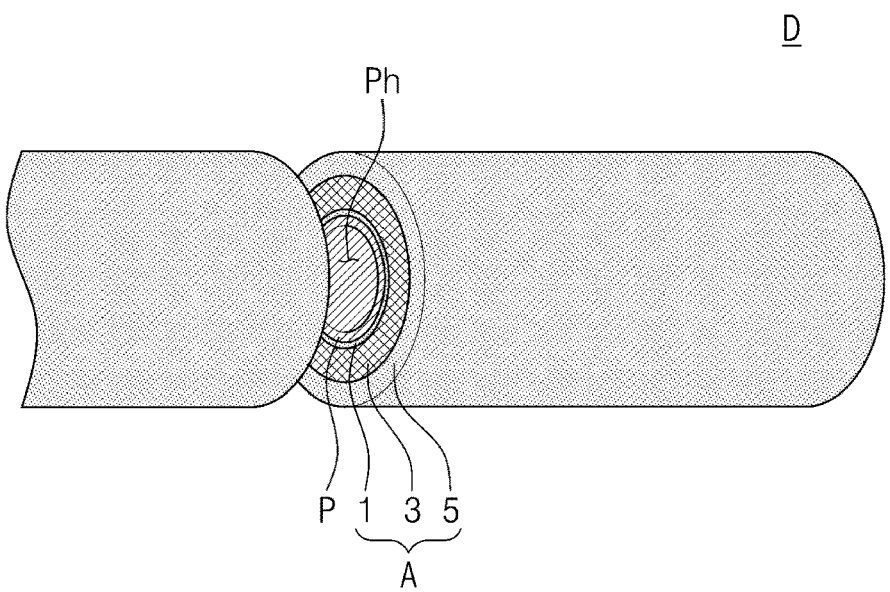
FIG. 2 illustrates a cutaway perspective view showing an insulated piping device according to some embodiments of the present inventive concepts.
Figure 3:
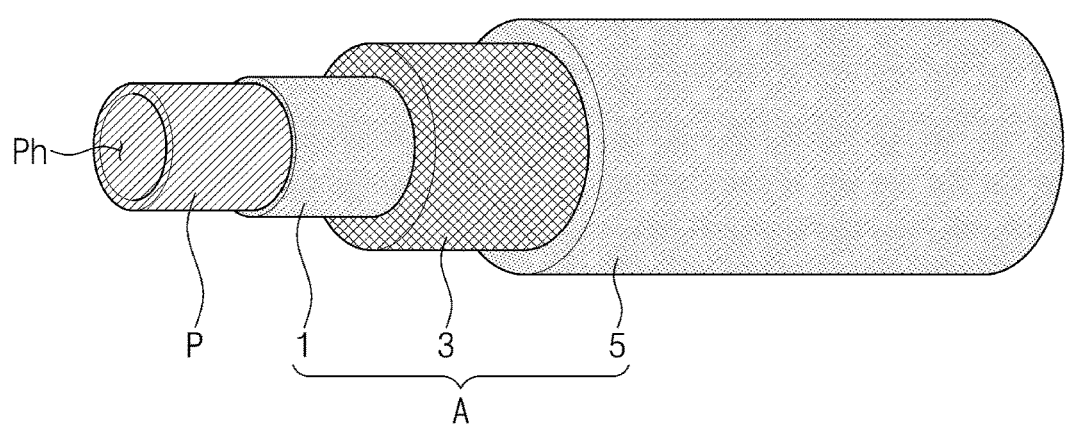
FIG. 3 illustrates an exploded perspective view showing an insulated piping device according to some embodiments of the present inventive concepts.

FIG. 2 illustrates a cutaway perspective view showing an insulated piping device according to some embodiments of the present inventive concepts. FIG. 3 illustrates an exploded perspective view showing an insulated piping device according to some embodiments of the present inventive concepts.

Referring to FIGS. 2 and 3, the insulated piping device D may include a pipe P and an insulation structure A.

The pipe P may provide an internal passage Ph. The pipe P may extend in one direction. Therefore, the internal passage Ph may also extend in one direction. The pipe P may have an annular shape at its cross section that is perpendicular to the direction that the pipe P extends; however, the present inventive concepts are not limited thereto. The coolant may flow along the internal passage Ph of the pipe P. The pipe P may be surrounded by the insulation structure A. Therefore, an outer surface of the pipe P may not be exposed externally.

The insulation structure A may surround the pipe P. The insulation structure A may block or reduce a heat exchange between an external space and a fluid that flows through the internal passage Ph of the pipe P. The insulation structure A may include a first insulation layer 1, a second insulation layer 3, and a third insulation layer 5.

The first insulation layer 1 may be on the pipe P. For example, the first insulation layer 1 may surround the external surface of the pipe P. For example, the first insulation layer 1 may surround the pipe P while being in contact with the external surface of the pipe P. The first insulation layer 1 may be used even at low temperatures. The phrase "used at low temperatures" means that there is little or no degeneration of materials in the component or layer even at low temperatures. For example, the first insulation layer 1 may have little or no degeneration of materials even at low temperatures. The first insulation layer 1 may be used at lower temperatures than the second insulation layer 3. For example, the first insulation layer may be used at temperatures equal to or less than about −50° C. For more detail, the first insulation layer 1 may be used with little or no degeneration of materials at temperatures in the vicinity of about −100° C. The first insulation layer 1 may include a material whose thermal conductivity is low. The first insulation layer 1 may have a thermal conductivity less than that of the second insulation layer 3. For example, the thermal conductivity of the first insulation layer 1 may range from about 0.010 W/mK to about 0.040 W/mK. The first insulation layer 1 may include a silica aerogel. The silica aerogel may be used in a temperature range of about −100° C. to about 120° C. with little or no degradation. The silicon aerogel may have a thermal conductivity of about 0.020 W/mK to about 0.030 W/mK. The present inventive concepts, however, are not limited thereto, and the first insulation layer 1 may include a material other than silicon aerogel.

The second insulation layer 3 may be on the first insulation layer 1. For example, the second insulation layer 3 may surround the first insulation layer 1. The second insulation layer 3 may include a different material from that of the first insulation layer 1. The second insulation layer 3 may be used at a temperature greater than that of the first insulation layer 1 with little to no degradation of materials. For example, the second insulation layer 3 may have a use temperature of about −70° C. to about 180° C. The second insulation layer 3 may have a thermal conductivity greater than that of the first insulation layer 1. For example, the thermal conductivity of the second insulation layer 3 may range from about 0.03 W/mK to about 0.06 W/mK. The second insulation layer 3 may include foam. For example, second insulation layer 3 may have a porous structure. The second insulation layer 3 may have fine pores therein. Air may fill the fine pores in the second insulation layer 3. Therefore, the second insulation layer 3 may increase in insulation performance. The second insulation layer 3 may include a polyethylene-based material. For example, the second insulation layer 3 may include an ethylene propylene diene monomer (EPDM). The EPDM may have a thermal conductivity of about 0.033 W/mK to about 0.05 W/mK. The EPDM may have a use temperature of about −50° C. to about 165° C. The present inventive concepts, however, are not limited thereto, and the second insulation layer 3 may include a material other than EPDM.

The third insulation layer 5 may be positioned on the second insulation layer 3. For example, the third insulation layer 5 may surround the second insulation layer 3. The third insulation layer 5 may include a different material from that of the second insulation layer 3. The third insulation layer 5 may have a hardness greater than that of the second insulation layer 3. For example, the third insulation layer 5 may have a Shore hardness of about 60 Shore D to about 66 Shore D. The second insulation layer 3 may have a Shore hardness less than that of the third insulation layer 5. The present inventive concepts, however, are not limited thereto. Moreover, a hardness value other than the Shore hardness may be employed for comparison. For example, the third insulation layer 5 may have a hardness (e.g., a Mohs hardness) greater than that of the second insulation layer 3. The third insulation layer 5 may be water resistant or waterproof That is, the third insulation layer 5 may reduce or generally prevent water from passing through an outer surface of the third insulation layer 5. The third insulation layer 5 may have moisture permeance less than that of the second insulation layer 3. Therefore, water vapor in the air or environment surrounding the device D may not pass through the third insulation layer 5. The third insulation layer 5 may be used at a temperature equal to or less than about −32° C. with little to no degradation of materials. The third insulation layer 5 may include a polyurea-based material. The polyurea may have a Shore hardness of about 62 Shore D to about 64 Shore D. The polyurea may be used at a temperature equal to less than about −34° C. The polyurea may have a thermal conductivity of about 0.134 W/mK to about 0.154 W/mK. The present inventive concepts, however, are not limited thereto, and the third insulation layer 5 may include a material other than polyurea.

As illustrated, the insulation structure A surrounds the pipe P; however, the present inventive concepts are not limited thereto. For example, the insulation structure A may surround a different insulation object other than a pipe P. For example, the insulation structure A may be used to surround a low-temperature tank, a compressor, and/or a chiller. A detailed description thereof will be further discussed below.

Figure 4:
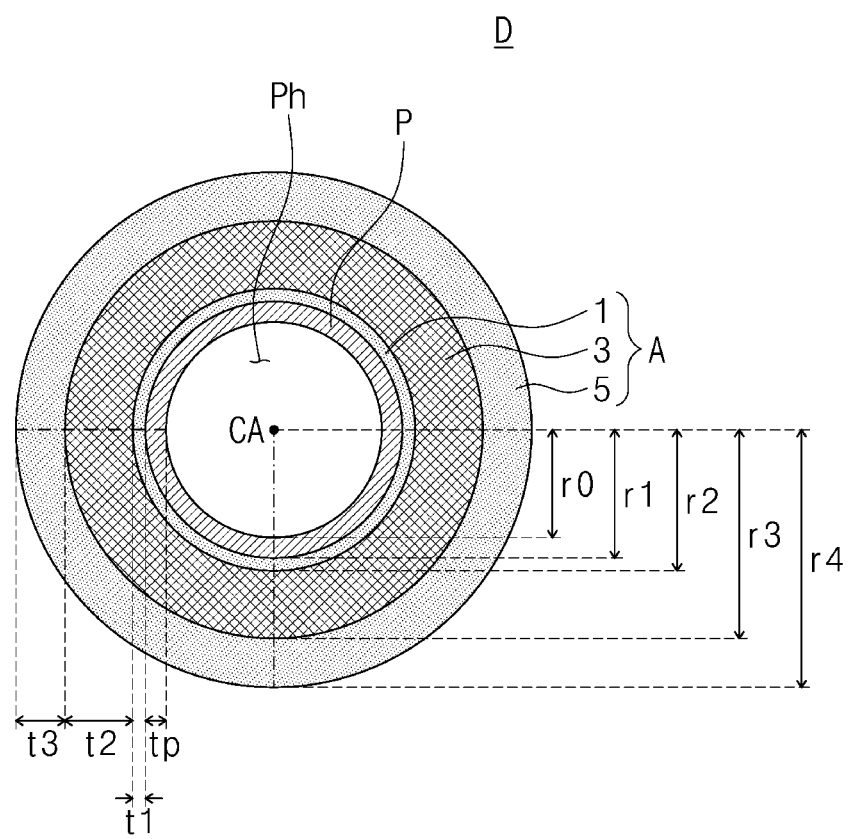
FIG. 4 illustrates a cross-sectional view showing an insulated piping device according to some embodiments of the present inventive concepts.

FIG. 4 illustrates a cross-sectional view showing an insulated piping device according to some embodiments of the present inventive concepts.

Referring to FIG. 4, each of the pipe P, the first insulation layer 1, the second insulation layer 3, and the third insulation layer 5 may form a concentric circle around a central axis CA.

A zeroth radius r0 may indicate an inner radius of the pipe P. A first radius r1 may indicate an outer radius of the pipe P. A second radius r2 may indicate an outer radius of the first insulation layer 1. A third radius r3 may indicate an outer radius of the second insulation layer 3. A fourth radius r4 may indicate an outer radius of the third insulation layer 5.

A zeroth thickness tp may indicate a thickness of the pipe P. The zeroth thickness tp may be substantially the same as a difference between the first radius r1 and the zeroth radius r0.

A first thickness t1 may indicate a thickness of the first insulation layer 1. The first thickness t1 may be substantially the same as a difference between the second radius r2 and the first radius r1.

A second thickness t2 may indicate a thickness of the second insulation layer 3. The second thickness t2 may be substantially the same as a difference between the third radius r3 and the second radius r2.

A third thickness t3 may indicate a thickness of the third insulation layer 5. The third thickness t3 may be substantially the same as a difference between the fourth radius r4 and the third radius r3.

The second insulation layer 3 may be thicker than each of the first insulation layer 1 and the third insulation layer 5. For example, the second thickness t2 may be greater than each of the first thickness t1 and the third thickness t3. The second thickness t2 may range from about 7 mm to about 11 mm. For example, the second thickness t2 may be about 9 mm. The third thickness t3 may range from about 3 mm to about 7 mm. For example, the third thickness t3 may be about 5 mm. The first thickness t1 may range from about 0.5 mm to about 3.5 mm. For example, the first thickness t1 may be about 2 mm. The present inventive concepts, however, are not limited to the values mentioned above.

Figure 5:
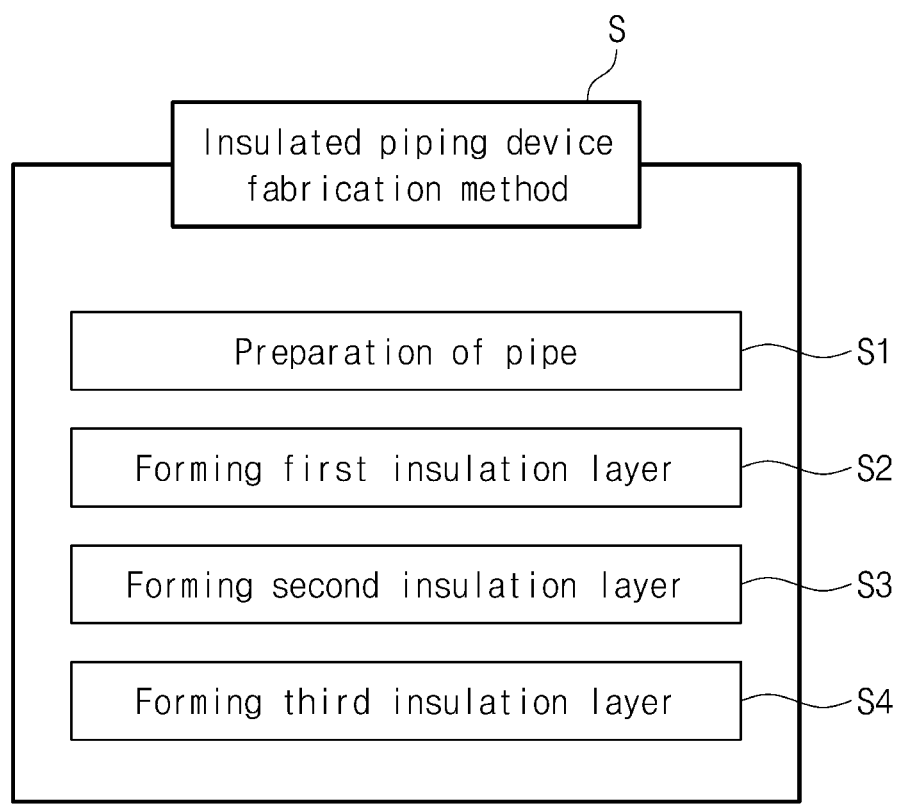
FIG. 5 illustrates a flow chart showing a method of fabricating an insulated piping device according to some embodiments of the present inventive concepts.

FIG. 5 illustrates a flow chart showing a method of fabricating an insulated piping device according to some embodiments of the present inventive concepts.

Referring to FIG. 5, there may be provided a method S of fabricating an insulated piping device. The insulated piping device fabrication method S may be a method of fabricating the insulated piping device D discussed with reference to FIG. 2. The insulated piping device fabrication method S may include a step S1 of preparing a pipe, a step S2 of forming a first insulation layer, a step S3 of forming a second insulation layer, and a step S4 of forming a third insulation layer.

With reference to FIGS. 6 to 9, the following will describe in detail each step of the insulated piping device fabrication method S of FIG. 5.

FIGS. 6 to 9 illustrate perspective views showing an insulated piping device fabrication method according to some embodiments of FIG. 5.

Figure 6:
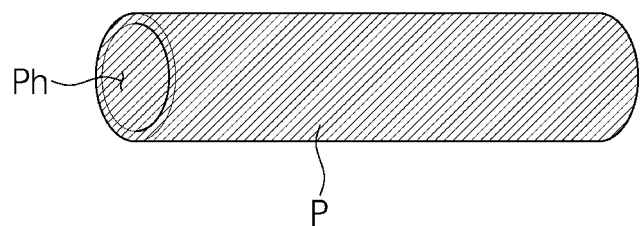
FIGS. 6 to 9 illustrate perspective views showing an insulated piping device fabrication method according to some embodiments of FIG. 5.

Referring to FIGS. 5 and 6, the pipe preparation step S1 may include preparing the pipe P that provides the internal passage Ph. The pipe P may be fabricated by various methods. For example, an injection method may be employed to fabricate the pipe P. The present inventive concepts, however, are not limited thereto, and other methods may be employed to fabricate the pipe P.

Figure 7:
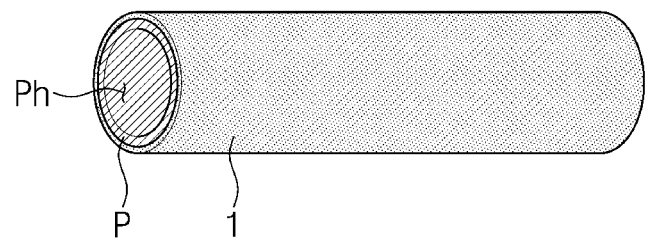

Referring to FIGS. 5 and 7, the first insulation layer forming step S2 may include forming the first insulation layer 1 on the outer surface of the pipe P. In some embodiments, a taping process may be performed to form the first insulation layer 1. For example, the first insulation layer 1 may be wound around the outer surface of the pipe P. When the first insulation layer 1 includes silicon aerogel, the first insulation layer forming step S2 may include winding a silica aerogel tape around the outer surface of the pipe P. The present inventive concepts, however, are not limited thereto, and the first insulation layer forming step S2 may be performed by using other methods.

Figure 8:
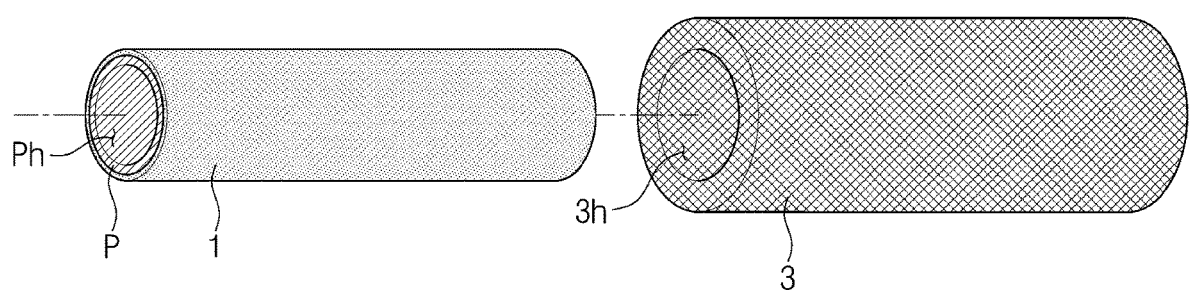

Referring to FIGS. 5 and 8, the second insulation layer forming step S3 may include allowing the second insulation layer 3 to cover the pipe P on which the first insulation layer 1 is coated. In some embodiments, the second insulation layer 3 may be previously formed in the shape of a hollow tube. The pipe P on which the first insulation layer 1 is previously formed may be inserted into an internal space 3h of the second insulation layer 3. The present inventive concepts, however, are not limited thereto, and the second insulation layer forming step S3 may be performed by using other methods.

Figure 9:
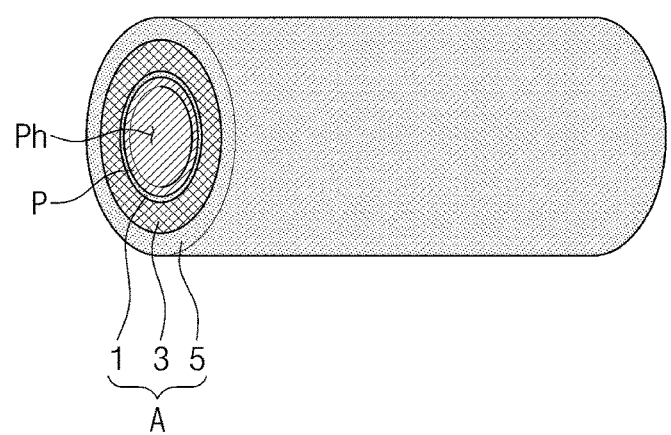

Referring to FIGS. 5 and 9, the third insulation layer forming step S4 may include forming the third insulation layer 5 on the second insulation layer 3 using a material that constitutes the third insulation layer 5. The material which constitutes the third insulation layer 5 may be sprayed on an outer surface of the second insulation layer 3. For example, when the third insulation layer 5 includes a polyurea-based material, the polyurea-based material may be sprayed on the second insulation layer 3. The third insulation layer forming step S4 may further include curing the material coated on the second insulation layer 3. For example, the material sprayed on the outer surface of the second insulation layer 3 may be cured by a passage of an amount of time. When the third insulation layer 5 includes a polyurea-based material, the polyurea-based material sprayed on the outer surface of the second insulation layer 3 may be cured in about 5 minutes to about 10 minutes. Therefore, the third insulation layer 5 may increase in hardness during the curing process. The present inventive concepts, however, are not limited thereto, and the third insulation layer coating step S4 may be performed by using other methods. When the curing of the third insulation layer 5 is terminated, the insulation structure A may be formed.

Figure 10:
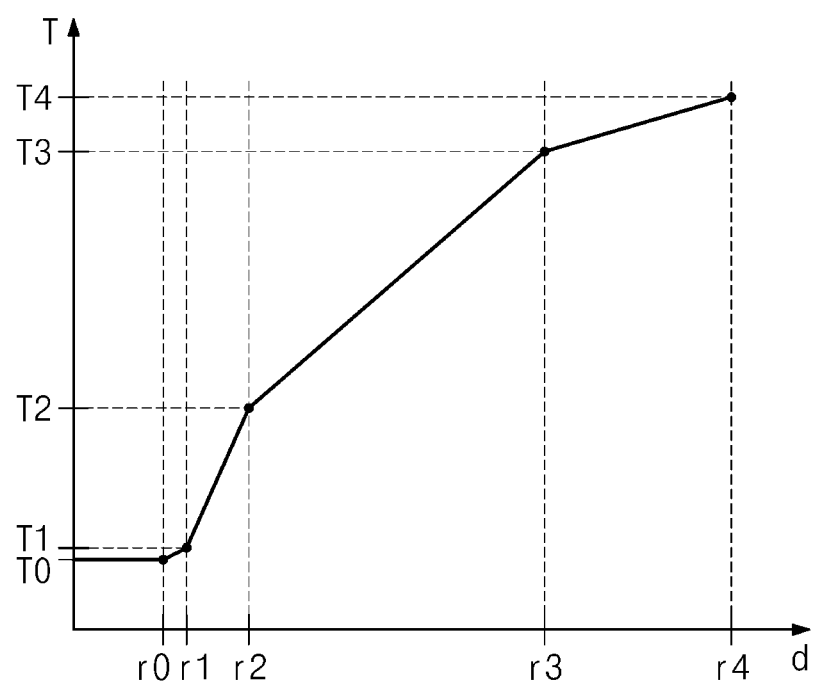
FIG. 10 illustrates a graph showing a temperature gradient of an insulated piping device according to some embodiments of the present inventive concepts.

FIG. 10 illustrates a graph showing a temperature gradient of an insulated piping device according to some embodiments of the present inventive concepts.

Referring to FIGS. 4 and 10, when a low-temperature coolant flows through the internal passage Ph of the pipe P, a temperature gradient of the pipe P and the insulation structure A that are affected by the low-temperature coolant may be represented by the graph of FIG. 10. In the graph of FIG. 10, a horizontal axis may indicate a distance d from the central axis CA discussed with reference to FIG. 4. A vertical axis may denote a temperature.

A region away from the central axis CA at a distance equal to or less than the zeroth radius r0 may signify the internal passage Ph. The internal passage Ph may have a zeroth temperature T0. The zeroth temperature T0 may be substantially the same as or similar to a temperature of the coolant.

A region away from the central axis CA at a distance between the zeroth radius r0 and the first radius r1 may signify an area within the pipe P. The area within the pipe P may have a temperature ranging from the zeroth temperature T0 to a first temperature T1. The first temperature T1 may be greater than the zeroth temperature T0.

A region away from the central axis CA at a distance between the first radius r1 and the second radius r2 may signify an area within the first insulation layer 1. The area within the first insulation layer 1 may have a temperature ranging from the first temperature T1 to a second temperature T2. The second temperature T2 may be greater than the first temperature T1.

A region away from the central axis CA at a distance between the second radius r2 and the third radius r3 may signify an area within the second insulation layer 3. The area within the second insulation layer 3 may have a temperature ranging from the second temperature T2 to a third temperature T3. The third temperature T3 may be greater than the second temperature T2.

A region away from the central axis CA at a distance between the third radius r3 and the fourth radius r4 may signify an area within the third insulation layer 5. The area within the third insulation layer 5 may have a temperature ranging from the third temperature T3 to a fourth temperature T4. The fourth temperature T4 may be greater than the third temperature T3.

Because the thermal conductivity of the first insulation layer 1 is less than that of the second insulation layer 3, a slope of the graph in a region between the first radius r1 and the second radius r2 may be greater than a slope of the graph in a region between the second radius r2 and the third radius r3.

The temperature gradient is illustrated linearly in the graph of FIG. 10, but the present inventive concepts are not limited thereto. For example, based on shapes and materials of the pipe P and the insulation structure A, the temperature gradient may not be illustrated linearly, but may be illustrated curvedly.

According to some embodiments of an insulation structure, an insulated piping device including the same, and a method of fabricating the same in accordance with some embodiments of the present inventive concepts, the thermal conductivity of the first insulation layer 1 may be less than that of the second insulation layer 3. Therefore, even when the first insulation layer has a small thickness, there may be a large difference in temperature between inner and outer surfaces of the first insulation layer 1. Thus, the first insulation layer 1 may have an excellent insulation effect. Even when an inside of the first insulation layer becomes cryogenic, the outer surface of the first insulation layer 1 may have a significantly large temperature. For example, the temperature at the outer surface of the first insulation layer 1 may be greater than the temperature in which the second insulation layer 3 may be used without significant degradation. Even when the first insulation layer 1 has a small thickness, the temperature at the outer surface of the first insulation layer 1 may be greater than the temperature in which the second insulation layer 3 may be used without significant degradation in a state where the cryogenic coolant flows through the internal passage Ph. Therefore, the second insulation layer 3 may be prevented from being cured and fractured under a cryogenic environment. Moreover, fine particles that can disrupt the semiconductor fabrication processes and occur due to a fracture of the second insulation layer 3 may be reduced or prevented.

According to some embodiments of an insulation structure, an insulated piping device including the same, and a method of fabricating the same in accordance with some embodiments of the present inventive concepts, the second insulation layer 3 may include a porous foam. Thus, an air layer may be formed in the second insulation layer 3. Accordingly, the second insulation layer 3 may increase in insulation effect. In addition, the use of the porous foam may obtain an excellent insulation effect at low cost. Moreover, there may be simplicity and promptness in the fabrication of the second insulation layer 3 including the porous foam. The process time may then decrease.

According to some embodiments of an insulation structure, an insulated piping device including the same, and a method of fabricating the same in accordance with some embodiments of the present inventive concepts, the third insulation layer 5 may have a hardness greater than that of the second insulation layer 3. Thus, the second insulation layer 3 may be protected from external impact. In some embodiments, vibration may occur due to the coolant that flows through the internal passage Ph, and the third insulation layer 5, whose hardness is high, may reduce or prevent fractures in the second insulation layer 3. Therefore, the second insulation layer 3 may increase a life span of the insulation structure. Furthermore, fine particles produced by fractures of the second insulation layer 3, which may disturb the semiconductor fabrication process, may be reduced or prevented.

According to some embodiments of an insulation structure, an insulated piping device including the same, and a method of fabricating the same in accordance with some embodiments of the present inventive concepts, the third insulation layer 5 may be water resistant or waterproof Thus, the second insulation layer 3 may reduce or prevent the absorption of external moisture. For example, because external moisture does not pass through the third insulation layer 5, the moisture may be prevented from being introduced into the air in the porous structure of the second insulation layer 3. Thus, even when the second insulation layer 3 has a low temperature therein, moisture may be prevented from condensing. Accordingly, condensed moisture, which may disturb a semiconductor fabrication process, may be reduced or prevented.

According to some embodiments of an insulation structure, an insulated piping device including the same, and a method of fabricating the same in accordance with some embodiments of the present inventive concepts, because the first insulation layer 1 is formed by a taping process, the first insulation layer 1 may be installed on pipes made of soft material. In addition, because the third insulation layer 5 is coated by spray method, the third insulation layer 5 may be installed on pipes made of soft material.

Figure 11:
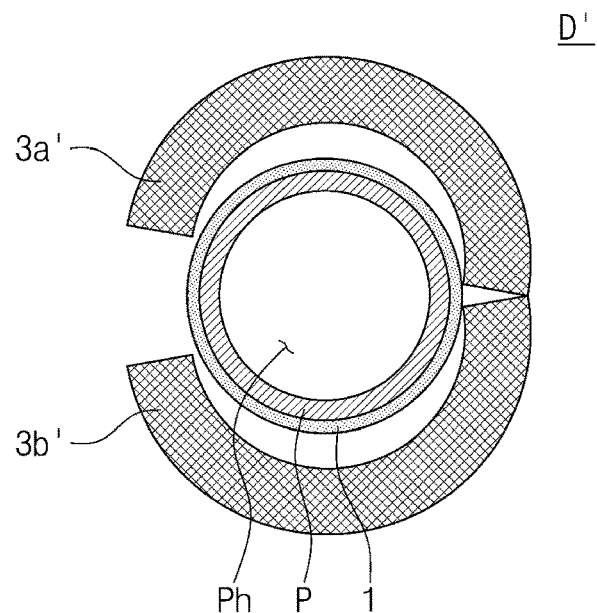
FIG. 11 illustrates a cross-sectional view showing an insulated piping device according to some embodiments of the present inventive concepts.

FIG. 11 illustrates a cross-sectional view showing an insulated piping device according to some embodiments of the present inventive concepts.

Hereinafter, components substantially the same as or similar to those discussed with reference FIGS. 1 to 10 will be omitted in the interest of convenience.

Referring to FIG. 11, an insulated piping device D' may be provided. The insulated piping device D' of FIG. 11 may be fabricated by a different method from that for fabricating the insulated piping device D discussed with reference to FIG. 2. For example, a different method may be employed to couple a second insulation layer 3a' and 3b' to the first insulation layer 1. The second insulation layer 3a' and 3b' may be divided into two pieces. The divided two second insulation layers 3a' and 3b' may be coupled to the first insulation layer 1 while overlying and underlying the first insulation layer 1. Therefore, the divided two second insulation layers 3a' and 3b' may be jointed into a single piece to surround the first insulation layer 1. A tape may be used to join to each other the two second insulation layers 3a' and 3b', but the present inventive concepts are not limited thereto.

Figure 12:
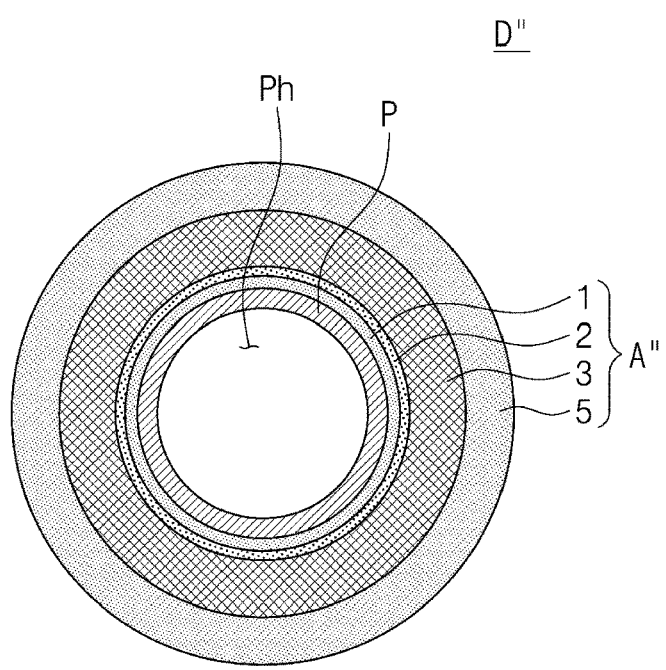
FIG. 12 illustrates a cross-sectional view showing an insulated piping device according to some embodiments of the present inventive concepts.

FIG. 12 illustrates a cross-sectional view showing an insulated piping device according to some embodiments of the present inventive concepts.

Hereinafter, components substantially the same as or similar to those discussed with reference FIGS. 1 to 11 will be omitted in the interest of convenience.

Referring to FIG. 12, an insulated piping device D" may be provided. The insulated piping device D" may be different from the insulated piping device D discussed with reference to FIG. 2. In some embodiments, the insulated piping device D" of FIG. 11 may further include an adhesion layer 2. For example, an insulation structure A" may further include the adhesion layer 2 between the first insulation layer 1 and the second insulation layer 3. Therefore, an air layer may be reduced or removed between the first insulation layer 1 and the second insulation layer 3. Accordingly, condensation of water vapor may be reduced or prevented around the first insulation layer 1.

Figure 13:
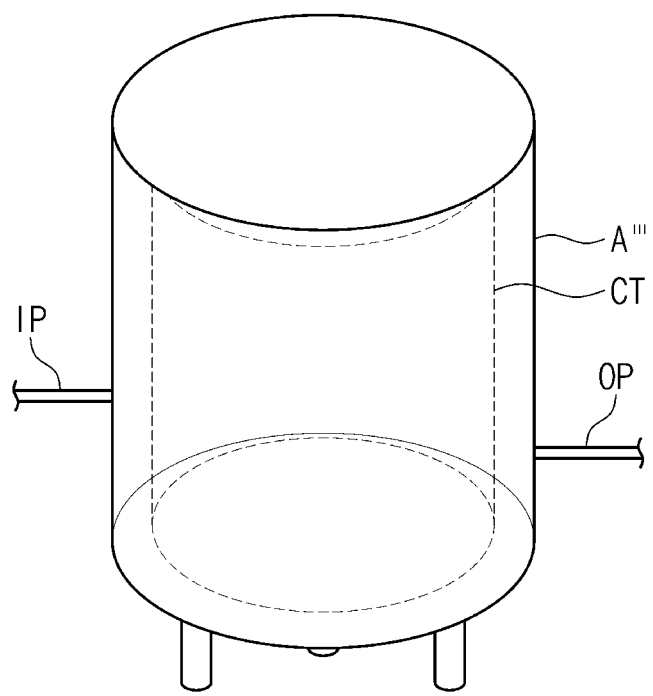
FIG. 13 illustrates a cross-sectional view showing an example of an insulated piping device according to some embodiments of the present inventive concepts.

FIG. 13 illustrates a cross-sectional view showing an example of an insulated piping device according to some embodiments of the present inventive concepts.

Hereinafter, components substantially the same as or similar to those discussed with reference FIGS. 1 to 12 will be omitted in the interest of convenience.

Referring to FIG. 13, an insulation structure A'" may be used to surround a chiller CT. The chiller CT may be used to reduce a temperature of a fluid in the chiller CT. An inlet pipe IP and an outlet pipe OP may be coupled to the chiller CT. The insulation structure A'" may insulate the chiller CT from outside, while surrounding a body of the chiller CT. In addition, the insulation structure A'" may be used to surround a body of a compressor.

According to some embodiments of an insulation structure, an insulated piping device including the same, and a method of fabricating the same in accordance with the present inventive concepts, it may be possible to reduce or prevent a fabrication process from being disturbed due to condensation of water vapor.

According to some embodiments of an insulation structure, an insulated piping device including the same, and a method of fabricating the same in accordance with the present inventive concepts, fractures in an insulation layer may be reduced or prevented and may increase in life span.

According to some embodiments of an insulation structure, an insulated piping device including the same, and a method of fabricating the same in accordance with the present inventive concepts, an insulation structure may be applied to variously shaped pipes.

Effects of the present inventive concepts are not limited to the mentioned above, other effects which have not been mentioned above will be clearly understood to those skilled in the art from the following description.

Although the present inventive concepts have been described in connection with some embodiments of the present inventive concepts illustrated in the accompanying drawings, it will be understood to those skilled in the art that various changes and modifications may be made without departing from the technical spirit and essential feature of the present inventive concepts. It therefore will be understood that the embodiments described above are just illustrative but not limitative in all aspects.

What is claimed is:

1. An insulated piping device, comprising:
 a pipe; and
 an insulation structure on an outer surface of the pipe,
 wherein the insulation structure includes:
  a first insulation layer on the outer surface of the pipe;
  a second insulation layer on an outer surface of the first insulation layer comprising a porous foam material that is different from a material of the first insulation layer; and
  a third insulation layer on an outer surface of the second insulation layer comprising a material different from the material of the second insulation layer,
 wherein a thickness of the second insulation layer is greater than a thickness of the first insulation layer and a thickness of the third insulation layer, and
 wherein a thermal conductivity of the first insulation layer is less than a thermal conductivity of the second insulation layer.

2. The insulated piping device of claim 1, wherein a hardness of the third insulation layer is greater than a hardness of the second insulation layer.

3. The insulated piping device of claim 1, wherein the third insulation layer is water resistant or waterproof.

4. The insulated piping device of claim 1, wherein the second insulation layer includes an ethylene propylene diene monomer (EPDM).

5. The insulated piping device of claim 1, wherein the first insulation layer includes silica aerogel.

6. The insulated piping device of claim 1, wherein the third insulation layer includes a polyurea-based material.

7. The insulated piping device of claim 1, wherein
 the thickness of the first insulation layer is about 2 mm,
 the thickness of the second insulation layer is about 9 mm, and
 the thickness of the third insulation layer is about 5 mm.

8. The insulated piping device of claim 1, further comprising an adhesion layer between the first insulation layer and the second insulation layer.

9. An insulation structure, comprising:
 a first insulation layer on an outer surface of an insulation target;
 a second insulation layer on the first insulation layer; and
 a third insulation layer on the second insulation layer,
 wherein the second insulation layer includes a porous foam, wherein a thickness of the second insulation layer is greater than a thickness of the first insulation layer, wherein a thermal conductivity of the first insulation layer is less than a thermal conductivity of the second insulation layer, wherein a hardness of the third insulation layer is greater than a hardness of the second insulation layer, and wherein the first insulation layer includes silica aerogel, the second insulation layer includes an ethylene propylene diene monomer (EPDM), and the third insulation layer includes a polyurea-based material.

10. The insulation structure of claim 9, wherein the third insulation layer is water resistant or waterproof, and a thickness of the third insulation layer is less than the thickness of the second insulation layer.

11. The insulation structure of claim 9, wherein the thickness of the first insulation layer is in a range of about 0.5 mm to about 3.5 mm, the thickness of the second insulation layer is in a range of about 7 mm to about 11 mm, and a thickness of the third insulation layer is in a range of about 3 mm to about 7 mm.

12. A method of fabricating an insulated device, the method comprising:

forming a first insulation layer on an outer surface of an insulation target;

forming a second insulation layer on the first insulation layer, the second insulation layer including a material different from a material of the first insulation layer; and forming a third insulation layer on the second insulation layer, the third insulation layer including a material different from the material of the second insulation layer, wherein a thickness of the second insulation layer is greater than a thickness of the first insulation layer, wherein the second insulation layer includes a porous foam, and wherein forming the first insulation layer includes taping a silica aerogel tape on the outer surface of the insulation target.

13. The method of claim 12, wherein forming the third insulation layer includes:

coating a polyurea-based material on the second insulation layer; and curing the polyurea-based material on the second insulation layer.

14. The method of claim 13, wherein coating the polyurea-based material on the second insulation layer includes spraying the polyurea-based material on the second insulation layer.

15. The method of claim 12, wherein the thickness of the first insulation layer is in a range of about 0.5 mm to about 3.5 mm, the thickness of the second insulation layer is in a range of about 7 mm to about 11 mm, and a thickness of the third insulation layer is in a range of about 3 mm to about 7 mm.

16. The method of claim 12, wherein the insulated device comprises an and insulated piping device, and a thermal conductivity of the first insulation layer is less than a thermal conductivity of the second insulation layer.

17. The method of claim 12, wherein a hardness of the third insulation layer is greater than a hardness of the second insulation layer.

* * * * *